United States Patent
Lastinger et al.

(10) Patent No.: US 8,270,383 B2
(45) Date of Patent: *Sep. 18, 2012

(54) METHODS AND APPARATUS FOR OVERLAPPING MIMO PHYSICAL SECTORS

(75) Inventors: Roc Lastinger, Cave Creek, AZ (US); John Spenik, Phoenix, AZ (US); Brian Woodbury, Gilbert, AZ (US)

(73) Assignee: Rotani, Inc., Cave Creek, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/218,185

(22) Filed: Aug. 25, 2011

(65) Prior Publication Data

US 2011/0310874 A1   Dec. 22, 2011

Related U.S. Application Data

(63) Continuation of application No. 13/118,386, filed on May 28, 2011, which is a continuation of application No. 11/709,431, filed on Feb. 21, 2007, now Pat. No. 8,009,646.

(60) Provisional application No. 60/743,376, filed on Feb. 28, 2006.

(51) Int. Cl.
*H04W 4/00* (2009.01)
(52) U.S. Cl. ............ 370/338; 370/328; 455/422.1; 455/424; 455/443; 455/452.2
(58) Field of Classification Search .......... 370/338, 370/328; 455/422.1, 424, 443, 452.2
See application file for complete search history.

(56) References Cited

U.S. PATENT DOCUMENTS

| | | | |
|---|---|---|---|
| 4,144,496 A | 3/1979 | Cunningham et al. |
| 4,475,010 A | 10/1984 | Huensch et al. |
| 5,161,249 A | 11/1992 | Meche et al. |
| 5,771,449 A | 6/1998 | Blasing |
| 6,047,175 A | 4/2000 | Trompower |
| 6,104,935 A | 8/2000 | Smith et al. |
| 6,118,767 A | 9/2000 | Shen et al. |
| 6,229,486 B1 | 5/2001 | Krile |
| 6,246,674 B1 | 6/2001 | Feuerstein et al. |
| 6,272,337 B1 | 8/2001 | Mount et al. |
| 6,278,723 B1 | 8/2001 | Meihofer et al. |
| 6,304,762 B1 | 10/2001 | Myers et al. |
| 6,388,999 B1 | 5/2002 | Gorsuch et al. |
| 6,400,955 B1 | 6/2002 | Kawabata et al. |
| 6,405,058 B2 | 6/2002 | Bobier |
| 6,421,542 B1 | 7/2002 | Sandler et al. |
| 6,463,301 B1 | 10/2002 | Bevan |
| 6,470,195 B1 | 10/2002 | Meyer |
| 6,486,832 B1 | 11/2002 | Abramov |

(Continued)

FOREIGN PATENT DOCUMENTS

WO   WO 2005/010652   2/2005

*Primary Examiner* — Nghi H Ly
(74) *Attorney, Agent, or Firm* — Letham Law Firm LLC; Lawrence Letham

(57) ABSTRACT

A system for communicating with wireless devices. The systems includes radio groups whose MIMO physical sectors overlap. The MIMO physical sectors communicate using different channels. The MIMO physical sectors overlap to form an area of overlap. Each radio group includes a phased array and radios. Radios are selectively coupled to the phased array. The physical sector of the phase array provides the MIMO physical sector. The phase array operates as a MIMO antenna.

15 Claims, 8 Drawing Sheets

U.S. PATENT DOCUMENTS

| | | |
|---|---|---|
| 6,505,045 B1 | 1/2003 | Hills |
| 6,531,985 B1 | 3/2003 | Jones |
| 6,542,736 B1 | 4/2003 | Parkvall et al. |
| 6,560,443 B1 | 5/2003 | Vaisanen |
| 6,690,657 B1 | 2/2004 | Lau |
| 6,693,510 B1 | 2/2004 | Yamaguchi |
| 6,774,864 B2 | 8/2004 | Evans |
| 6,870,515 B2 * | 3/2005 | Kitchener et al. ............ 343/853 |
| 7,193,562 B2 | 3/2007 | Shtrom |
| 7,292,198 B2 | 11/2007 | Shtrom |
| 7,358,912 B1 | 4/2008 | Kish |
| 7,362,280 B2 | 4/2008 | Shtrom |
| 7,415,288 B1 | 8/2008 | Hou |
| 7,498,996 B2 | 3/2009 | Shtrom |
| 7,498,999 B2 | 3/2009 | Shtrom |
| 7,511,680 B2 | 3/2009 | Shtrom |
| 7,522,552 B2 | 4/2009 | Fein et al. |
| 7,525,486 B2 | 4/2009 | Shtrom |
| 7,639,106 B2 | 12/2009 | Shtrom |
| 7,646,343 B2 | 1/2010 | Shtrom |
| 7,652,632 B2 | 1/2010 | Shtrom |
| 7,675,474 B2 | 3/2010 | Shtrom |
| 7,880,683 B2 | 2/2011 | Shtrom |
| 7,893,882 B2 | 2/2011 | Shtrom |
| 7,899,497 B2 | 3/2011 | Kish |
| 7,965,252 B2 | 6/2011 | Shtrom |
| 8,009,646 B2 * | 8/2011 | Lastinger et al. ............. 370/338 |
| 8,111,678 B2 * | 2/2012 | Lastinger et al. ............. 370/338 |
| 2001/0046866 A1 | 11/2001 | Wang |
| 2002/0019233 A1 | 2/2002 | Leung |
| 2002/0077152 A1 | 6/2002 | Johnson et al. |
| 2002/0159405 A1 | 10/2002 | Garrison et al. |
| 2002/0197984 A1 | 12/2002 | Monin et al. |
| 2003/0002442 A1 | 1/2003 | Flammer |
| 2003/0087645 A1 | 5/2003 | Kim |
| 2003/0109285 A1 | 6/2003 | Reed |
| 2003/0125089 A1 | 7/2003 | Pedersen |
| 2003/0181180 A1 | 9/2003 | Darabi |
| 2003/0210665 A1 | 11/2003 | Salmenkaita et al. |
| 2004/0009791 A1 | 1/2004 | Hiramatsu |
| 2004/0106412 A1 | 6/2004 | Laroia et al. |
| 2004/0196834 A1 | 10/2004 | Ofek |
| 2005/0003763 A1 | 1/2005 | Lastinger et al. |
| 2005/0003865 A1 | 1/2005 | Lastinger et al. |
| 2005/0009476 A1 * | 1/2005 | Wu et al. ....................... 455/101 |
| 2006/0038738 A1 | 2/2006 | Shtrom |
| 2006/0192720 A1 | 8/2006 | Shtrom |
| 2007/0026807 A1 | 2/2007 | Kish |
| 2009/0022066 A1 | 1/2009 | Kish |
| 2011/0228870 A1 * | 9/2011 | Lastinger et al. ............. 375/267 |
| 2011/0230141 A1 * | 9/2011 | Lastinger et al. ............. 455/63.4 |
| 2011/0281603 A1 * | 11/2011 | Lastinger et al. ............. 455/507 |

* cited by examiner

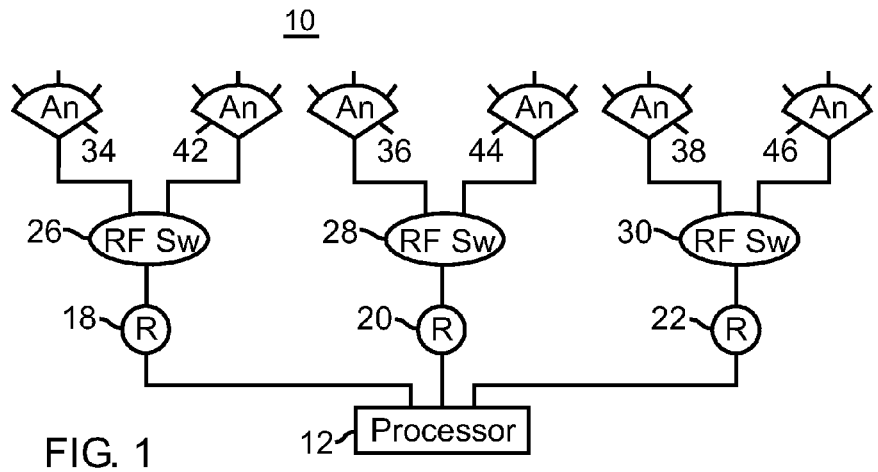
FIG. 1
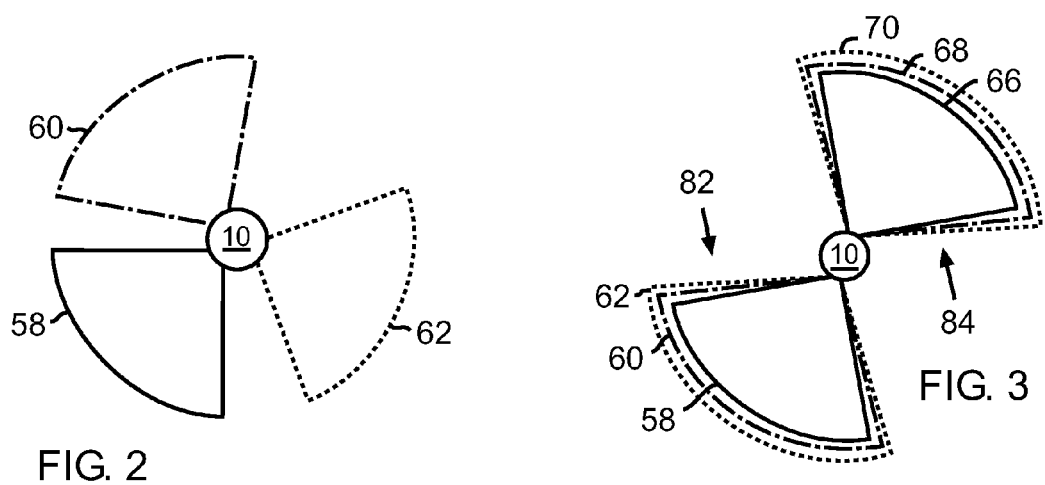
FIG. 2
FIG. 3
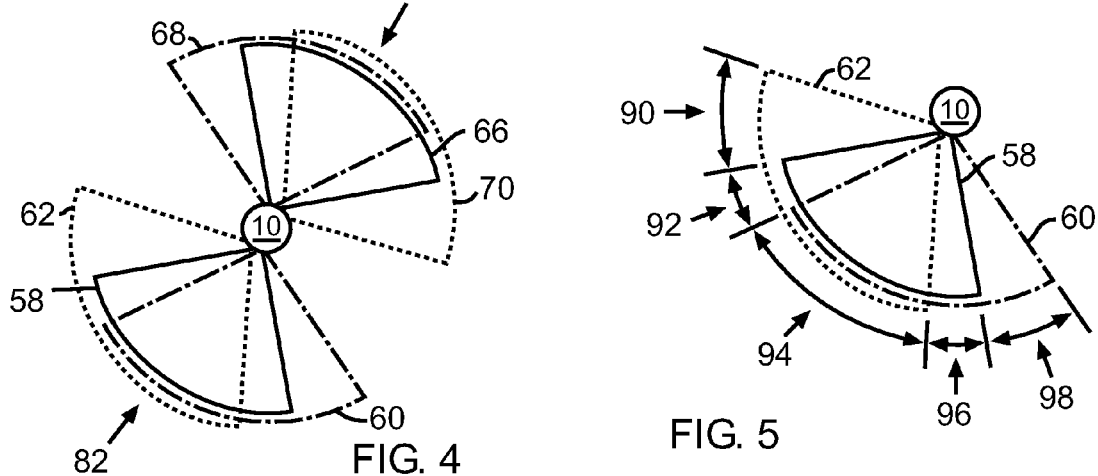
FIG. 4
FIG. 5

METHODS AND APPARATUS FOR OVERLAPPING MIMO PHYSICAL SECTORS

CROSS-REFERENCE TO RELATED APPLICATIONS

This application is a continuation of and claims priority under 35 U.S.C. §120 from U.S. patent application Ser. No. 13/118,386 by Lastinger filed May 28, 2011, which is a continuation of U.S. patent application Ser. No. 11/709,431 by Lastinger filed Feb. 21, 2007 and now U.S. Pat. No. 8,009,646, which claims priority under 35 U.S.C. §119(e) from U.S. patent application 60/743,376 filed Feb. 28, 2006, each of the aforementioned applications is herein incorporated by reference.

FIELD OF THE INVENTION

Embodiments of the present invention relate to wireless communication using Multiple Input Multiple Output ("MIMO") antennas and methods of operation.

BACKGROUND OF THE INVENTION

Wireless devices find uses in a variety of applications for example, providing communication between computers, wireless cells, clients, hand-held devices, mobile devices, and file servers. Wireless devices with Multiple Input Multiple Output ("MIMO") antennas benefit from spatial diversity and redundant signals. Noise sources may interfere with wireless devices that use MIMO antennas. Wireless communication using devices having MIMO antennas may substantially benefit from selecting a MIMO physical sector and/or a MIMO virtual sector to improve performance.

SUMMARY OF THE INVENTION

A MIMO system for communicating with a provided wireless device, according to various aspects of the present invention, includes at least three directional antennas and two radios. Each antenna is oriented such that a physical sector of each antenna partially overlaps a physical sector of at least one other antenna thereby forming respective areas of overlap. A center of each area of overlap is oriented in a unique direction with respect to the MIMO system. Each radio selectively couples to one respective antenna. The physical sectors of the antennas coupled to the radios at least partially overlap. The two radios communicate with the wireless device using the antennas coupled to each radio. The antennas coupled to the radios operate as a MIMO antenna.

Another MIMO system for communicating with a provided wireless device, according to various aspects of the present invention, includes at least four directional antennas and three radios. Each antenna is oriented such that a physical sector of each antenna partially overlaps a physical sector of at least two other antennas thereby forming respective areas of overlap. A center of each area of overlap is oriented in a unique direction with respect to the MIMO system. At least two radios selectively couple to one respective antenna. The physical sectors of the antennas coupled to the radios at least partially overlap. At least two radios communicate with the wireless device using the antennas coupled to the two radios. The antennas coupled to the radios operate as a MIMO antenna.

Another MIMO system for communicating with a provided wireless device, according to various aspects of the present invention, includes at least three directional antennas and a quantity of radios. The quantity of radios includes at least two radios. Each antenna is oriented such that a physical sector of each antenna partially overlaps a physical sector of a quantity of other antennas equal to at least the quantity of radios thereby forming respective areas of overlap. A center of each area of overlap is oriented in a unique direction with respect to the MIMO system. Each radio selectively couples to one respective antenna. The physical sectors of the antennas coupled to the radios overlap. The quantity of radios communicate with the wireless device using the respective antennas coupled to each radio, and the antennas coupled to the radios operate as a MIMO antenna.

Another MIMO system for communicating with a provided wireless device, according to various aspects of the present invention, includes at least four directional antennas and a quantity of radios. The quantity of radios includes at least three radios. Each antenna is oriented such that a physical sector of each antenna partially overlaps a physical sector of a quantity of other antennas equal to at least the quantity of radios thereby forming respective areas of overlap. A center of each area of overlap is oriented in a unique direction with respect to the MIMO system. Each radio selectively couples to one respective antenna. The physical sectors of the antennas coupled to the radios overlap. The three radios communicate with the wireless device using the respective antennas coupled to each radio, and the antennas coupled to the radios operate as a MIMO antenna.

BRIEF DESCRIPTION OF THE DRAWING

Embodiments of the present invention will now be further described with reference to the drawing, wherein like designations denote like elements, and:

FIG. 1 is a diagram of an exemplary wireless device according to the various aspects of the present invention;

FIG. 2 is a diagram of exemplary physical sectors;

FIG. 3 is a diagram of exemplary physical sectors that form exemplary MIMO physical sectors;

FIG. 4 is a diagram of exemplary MIMO virtual sectors;

FIG. 5 is a diagram of an exemplary MIMO virtual sector;

DETAILED DESCRIPTION OF THE PREFERRED EMBODIMENTS

Figure 6:
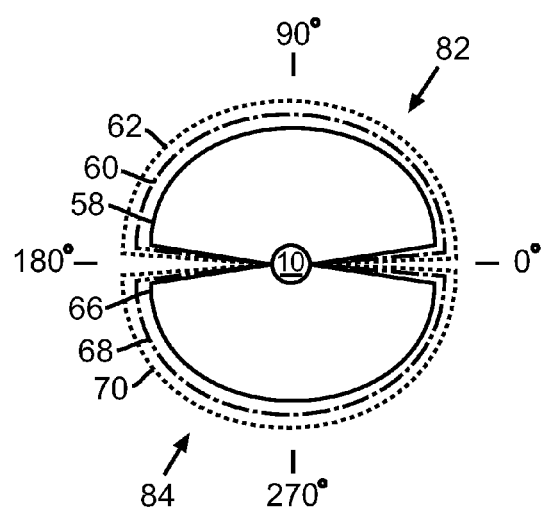
FIG. 6 is a diagram of exemplary MIMO virtual sectors.

Wireless devices use antennas to transmit and receive radio signals. Noise sources, such as other wireless devices including wireless devices that transmit on the same channel, may interfere with wireless communication. Conventional wireless devices use a variety of techniques to reduce the detrimental effect of noise on communication for example, dividing the area of coverage into sectors, using directional antenna, and using multiple antennas to provide redundancy and spatial diversity.

An improved wireless device, according to the various aspects of the present invention includes directional antennas positioned in such a way that the physical sectors of the antennas of the wireless device overlap and the antennas selected for communication are the antennas whose physical sectors overlap in an area in a manner that permits the antennas to operate as a Multiple Input Multiple Output ("MIMO") antenna.

The wireless device, according to the various aspects of the present invention may select for communication any suitable combination of directional antennas that operate as a MIMO antenna and are oriented in a desired direction of communication. Furthermore, the wireless device may assign any available channel to the antennas to improve performance.

A wireless device, according to the various aspects of the present invention includes, for example, wireless cells, access points, wireless clients, mobile computers, and handheld devices.

The term "physical sector" is understood to mean the area of coverage in which an antenna transmits and receives signals. The size and shape of a physical sector depends on a variety of factors for example, the type of antenna, atmospheric conditions, presence of noise sources, and physical surroundings. Physical sectors 58, 60 and 62 represent the two-dimensional shape of idealized physical sectors of directional antennas. Physical sectors 58, 60 and 62 do not overlap in FIG. 2. Physical sectors 58, 60 and 62 substantially overlap in FIG. 3. Physical sectors 58, 60 and 62 partially overlap in FIGS. 4 and 5.

The term "MIMO antenna" is understood to mean at least two antennas that each transmits and/or receives signals on the same channel in the area where the physical sectors of the antennas overlap. Antennas may be positioned in such a way that their physical sectors overlap. Antennas whose physical sectors overlap in the same area may be configured to operate as a MIMO antenna in that area. Each individual antenna of a MIMO antenna operates on the same channel (e.g., frequency, encoding, or other method of dividing the radio spectrum for communication). A MIMO antenna provides, inter alia, spatial diversity between the antennas, redundancy, and temporal diversity to reduce the effects of noise on transmission and reception. Reducing the effects of noise permits a wireless device to communicate more reliability.

Antennas that form a MIMO antenna may be oriented to use different signal polarization for example, horizontal, vertical, and circular. Antennas that form a MIMO antenna may be physically separated to provide spatial diversity.

MIMO physical sectors are formed to provide communication with increased immunity to noise within the area of the MIMO physical sector. The term "MIMO physical sector" means the area where the physical sectors of the antennas that operate as a MIMO antenna overlap.

Figure 7:
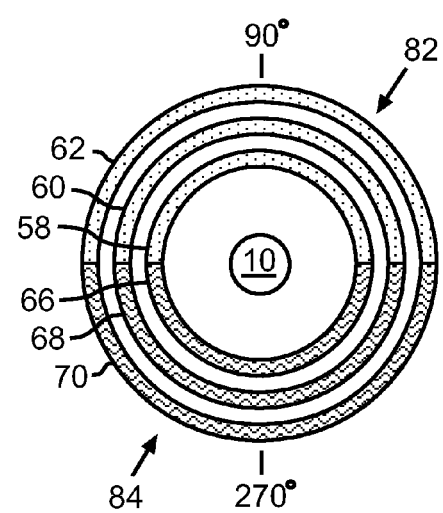
FIG. 7 is a diagram of exemplary alternate method for diagrammatically indicating physical sectors, MIMO physical sectors, and MIMO virtual sectors.

In an exemplary embodiment, referring to FIG. 3, physical sectors 58, 60, and 62 substantially overlap to form MIMO physical sector 82. Physical sectors 66, 68, and 70 substantially overlap to form a MIMO physical sector 84. In this embodiment, each MIMO physical sector has an angle of coverage of about 90 degrees. In another embodiment, referring to FIG. 6, each one physical sector 58, 60, and 62 and each one physical sector 66, 68, and 70 has an angle of coverage of about 180 degrees, thus the resulting MIMO physical sectors 82 and 84 have an angle of coverage of about 180 degrees. FIG. 7 represents an alternate method for diagrammatically representing physical sectors and MIMO physical sectors. Physical sectors 58-62 respectively have about a 180 degree angle of coverage and the center of each physical sector is oriented at approximately 90 degrees (straight up on the page). Each physical sector 58-62 extends from wireless device 10 to the furthest extent reached by the respective antennas even though FIG. 7 shows gaps between the physical sectors for clarity. The MIMO physical sectors 82 and 84 of FIGS. 6 and 7 are equivalent; however, the diagrammatical representation of FIG. 7 provides greater clarity. Thus, MIMO physical sectors 82 and 84 respectively include three substantially overlapping physical sectors 58-62 and 66-70.

The physical sectors of the antennas that form a MIMO antenna are not limited to being substantially overlapping. When physical sectors only partially overlap, the MIMO physical sector is the area where the physical sectors of the antennas that form the MIMO antenna overlap. Referring to FIGS. 4 and 5, the antennas associated with physical sectors 58-62 transmit and receive using the same channel. Area 94 is the area where physical sectors 58, 60, and 62 overlap, thus area 94 is a MIMO physical sector. The antennas associated with physical sectors 58-62 operate as a MIMO antenna in area 94. The MIMO physical sector formed by physical sectors 66-70 is also shown in FIG. 4 as MIMO physical sector 82.

Figure 19:
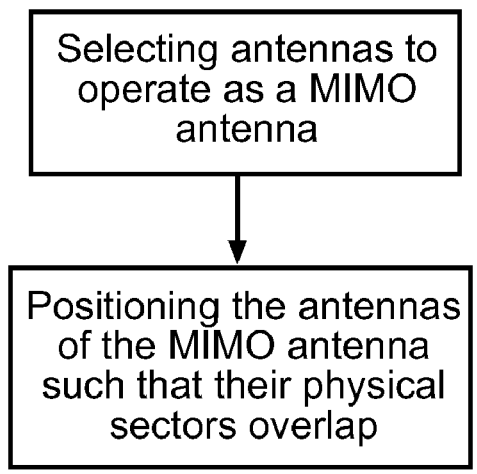
FIG. 19 is a diagram of a method for forming MIMO physical sectors.
Figure 20:
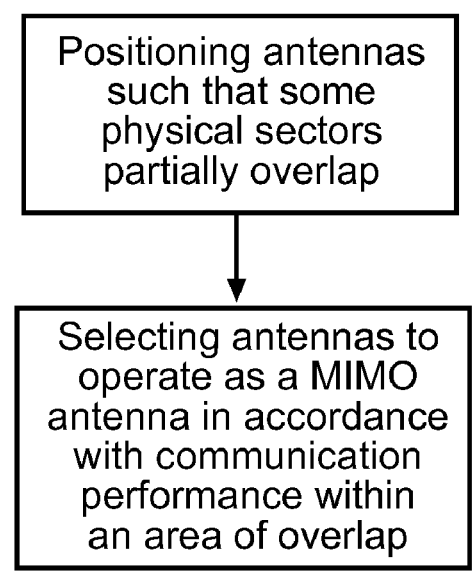
FIG. 20 is a diagram of a method for forming MIMO physical sectors.

MIMO physical sectors may be formed in a variety of ways. In one exemplary method for forming a MIMO physical sector, referring to FIG. 19, antennas are selected to operate as a MIMO antenna then the antennas are positioned in such a way that the physical sectors of the antennas overlap. In another exemplary method for forming a MIMO physical sector, referring to FIG. 20, a plurality of antennas are positioned in such a way that the physical sectors of at least some of the antennas at least partially overlap then at least two antennas are selected to operate as a MIMO antenna in the area where their physical sectors overlap to form a MIMO physical sector. The plurality of antennas may be positioned in such a way that the various MIMO physical sectors that are formed are oriented in different directions. At least two antennas may be selected to operate as a MIMO antenna in accordance with the orientation of the MIMO physical sector formed by the physical sectors of the selected antennas. The orientation of some MIMO physical sectors may provide increased performance over the orientation of other MIMO physical sectors. Furthermore, the antennas that form the MIMO antenna may be assigned any available channel.

Accordingly, the selected antennas, thus the MIMO physical sector, may be assigned to a channel that provides improved performance.

Figure 13:
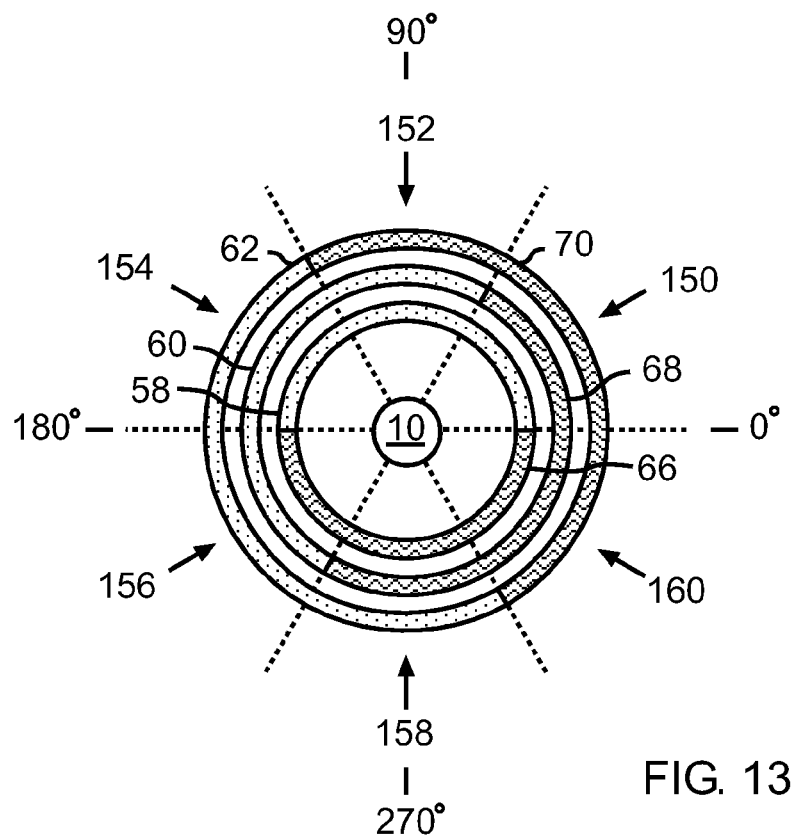
FIG. 13 is a diagram of exemplary physical sectors that partial overlap to form exemplary MIMO virtual sectors.

The term "MIMO virtual sector" means the area where the physical sectors of antennas that may operate as a MIMO antenna overlap. Referring to FIG. 13, physical sectors 58-62 and 66-70 each have an angle of coverage of about 180 degrees respectively. The antennas associated with physical sectors 58-62 and 66-70 are positioned in such a way that in area 150, physical sectors 58, 68, and 70 overlap. In area 152, physical sectors 58, 60, and 70 overlap and so forth for areas 154-160. Each one area 150-160 comprises a MIMO virtual sector because the antennas whose physical sectors overlap in the area may operate as a MIMO antenna. If the antennas associated with physical sectors 58, 68, and 70 are selected to form a MIMO antenna, then area 150 operates as a MIMO physical sector. If the antennas associated with physical sectors 58, 60, and 70 are selected to form a MIMO antenna, then area 152 operates as a MIMO physical sector and so forth for the other areas. Before antennas are selected to form a MIMO physical sector, areas 150-160 are MIMO virtual sectors. When antennas are selected to form a MIMO antenna, the area where the physical sectors of the selected antennas overlap become a MIMO physical sector while the other areas remain MIMO virtual sectors. A MIMO physical sector may also be referred to as a selected MIMO virtual sector or an active MIMO virtual sector. Any criteria may be used to select a MIMO virtual sector for communication.

The method of positioning antennas to form MIMO virtual sectors then selecting antennas to operate as a MIMO antenna permits the wireless device to respond to changes in, inter alia, performance, noise sources, and the environment by communicating through the MIMO physical sector that provides increased performance.

Positioning antennas to form MIMO virtual sectors permits a wireless device with fixed antenna positions to select from a variety of MIMO virtual sectors to communicate using the MIMO physical sector that provides a desired level of performance. When the performance of the selected MIMO physical sector deteriorates due to, inter alia, noise sources or environmental conditions, the wireless device can select different antennas to operate as a MIMO antenna, thereby selecting a different MIMO virtual sector to operate as a MIMO physical sector where the different MIMO physical sector provides increased performance.

MIMO physical sectors permits a wireless device to communicate with increased performance. MIMO virtual sectors permits a wireless device to select an area to transmit and receive in accordance with the MIMO virtual sector that provides a desired level of performance. A wireless device having multiple MIMO virtual sectors may select between the various MIMO virtual sectors. A wireless device may select the MIMO virtual sector that provides an increased level of performance. Positioning the antennas of a wireless device to form MIMO virtual sectors that are oriented in different directions permits the wireless device to select a MIMO physical sector based on the orientation of the virtual sector with relation to the position of noise sources.

Performance may be measure by, inter alia, throughput, data throughput, signal-to-noise ratio, reduced signal error, reduced data errors, reduced retransmission requests, reduced interference, rejection of multipath signals, higher transmission rates, and signal strength.

A MIMO system includes radios and antennas that may be configured to form MIMO antennas, MIMO physical sectors, and MIMO virtual sectors. A MIMO system may form a MIMO antenna using any suitable combination of radios and antennas. A MIMO system may select any suitable MIMO physical sector for communication. A MIMO system may have any suitable number of MIMO virtual sectors and/or selected MIMO virtual sectors. The MIMO system may position its MIMO physical sectors at any orientation. The MIMO physical sectors of a MIMO system may overlap other MIMO physical sectors of the same MIMO system. Overlapping MIMO physical sectors of the same MIMO system may be assigned different channels.

A MIMO system has at least two radios and at least two antennas where at least two radios and two antennas form a MIMO antenna. In another exemplary embodiment, referring to FIG. 1, a MIMO system has three radios with two antennas interfacing with each one radio. Three antennas, one antenna from each radio, may operate as a MIMO antenna, thereby resulting in a MIMO system having two MIMO antennas.

The present invention may employ various types of radios using any type of communication protocol and operating at any frequency and/or with any number of channels suitable for the application. The present invention may use any variety of antennas or groups of antennas for any purpose for example, transmission, reception, noise reduction, and multipath detection. Antennas may be positioned in any manner for example, their physical sectors may be overlapping and non-overlapping. Radios and antennas may operate as a MIMO system, MIMO antennas, MIMO physical sectors, and MIMO virtual sectors. Any type of algorithm and/or processor may be used to enable radios and/or antennas to form and operate as MIMO antennas. Antennas may be selected for communication according to any criteria such as for example, data throughput, signal strength, signal quality, and signal-to-noise ratio.

In one embodiment, the antennas of the wireless device are positioned to form non-overlapping MIMO physical sectors and one of the non-overlapping MIMO physical sectors is selected for communication with other wireless devices. In another embodiment, the antennas of the wireless device are positioned to form overlapping MIMO virtual sectors and some of the MIMO virtual sectors are selected for communication with other wireless devices.

The antennas that form a MIMO antenna may be used in any manner to transmit and/or receive signals for example, any number of antennas that operate as the MIMO antenna may transmit only, receive only, and transmit and receive signals.

In an exemplary embodiment, referring to FIG. 1, antennas 34, 36, and 38, with their associated radios, form a MIMO antenna in which each antenna 34, 36, and 38 transmits and receives the same signals. In another embodiment, antennas 34-38 form a MIMO antenna in which antenna 34 transmits, antenna 36 receives only, and antenna 38 transmits and receives. Different MIMO antenna configurations may provide different communication characteristics. For example, a configuration where all antennas of the MIMO antenna transmit and receive the same information may provide increased error correction. A configuration where antennas transmit and/or receive different information may provide increased data throughput. In an configuration where each antenna of the MIMO antenna receives some version of the same signal, the information content of the various signal versions received by the antennas of the MIMO antenna may be highly similar and/or less similar depending on environmental conditions for example, the presence of noise sources, multipath reflections, and spatial diversity of the antennas. Advanced algorithms may be used to process the signal received by each antenna that form the MIMO antenna to construct a resultant receive signal that contains as much of the receive signal information as can be extracted. The antennas of a MIMO antenna may be configured to receive signals from a common source by positioning the antennas such that their physical sectors overlap.

The number of antennas used to form a MIMO physical sector and the overlap of the physical sectors of the antennas may affect performance. For example, referring to FIGS. 1 and 5, area 90 receives coverage from only physical sector 62, thus communications within area 90 are transmitted and received by only antenna 38. Likewise, area 98 receives coverage only from physical sector 60 and antenna 36. Even when antennas 36 and 38 are selected to operate as a MIMO antennas, areas 90 and 98 are not MIMO physical sectors because only one antenna operates in the area. When only one antenna of the antennas selected to operate as a MIMO antenna transmits and receives in an area, the performance may not be as high as in the areas where the physical sectors of the antennas overlap to form a MIMO physical sector. Areas 92 and 96 receive coverage from physical sectors 58, 62 and 58, 60 respectively. Areas 92 and 96 are MIMO physical sectors because at least two antennas operate as a MIMO antenna in the areas. Communication using at least two antennas of the antennas selected to operate as a MIMO antenna may improve performance. Area 94, a MIMO physical sector formed by the overlap of the physical sectors of three antennas, receives coverage from physical sectors 58, 60 and 62 and their related antennas 34-38. Antennas 34-38 operate as a MIMO antenna, thus reception and/or transmission through all three antennas in area 94 may provide higher performance than reception and/or transmission through areas 90-92 and 96-98. The MIMO physical sector in area 94 is most likely to provide improved performance because all antennas of the MIMO antenna communicate in area 94.

Figure 8:
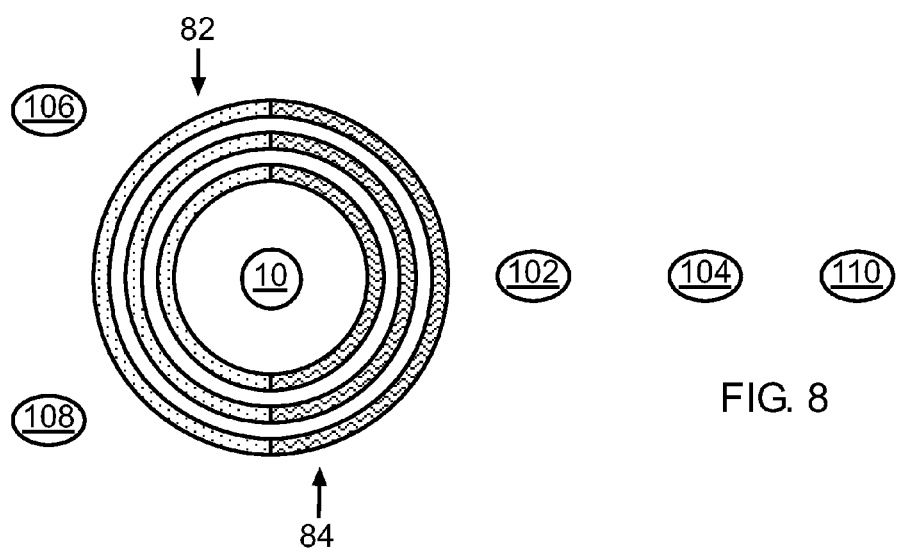
FIG. 8 is a diagram of communication between exemplary wireless devices in the presence of noise sources.

MIMO physical sectors formed using directional antennas may use conventional antenna select methods to reduce interference from noise sources. For example, referring to FIGS. 1 and 8, wireless device 10 comprises processor 12, radios 18-22, RF switches 26-30, and antennas 34-38 and 42-46 where two antennas interfacing with each one RF switch respectively. Antennas 34-38 and 42-46 operate as a first MIMO antenna and a second MIMO antenna respectively. Radios 18-22 use the 802.11a/b/g/n communication protocols. Antenna physical sectors 58-62, associated with antennas 34-38 respectively, substantially overlap to form MIMO physical sector 82. Antenna physical sectors 66-70, associated with antennas 42-46 respectively, substantially overlap to form MIMO physical sector 84. In this embodiment, each radio is set to the same channel. The physical sectors and the MIMO physical sectors 82-84 extend farther than shown in FIG. 8 to enable wireless device 10 to communicate with wireless device 102 and receive interference from noise sources 106 and 108. Wireless device 10 uses RF switches 26-30 to select between antennas 34-38 and 42-46. In this embodiment, the RF switches select between one of two groups of antennas; either antennas 34-38 or antennas 42-46 are selected, thus only one MIMO physical sector, either 82 or 84, is active at any given time. In the embodiment and the scenario described in FIG. 8, wireless device 10 selects MIMO antennas physical sector 84 to reduce interference from noise sources 106 and 108 while communicating with wireless device 102. Wireless device 104 of FIG. 8 may also be implemented using MIMO physical sectors similar to those of wireless device 10. Wireless device 104 may select the MIMO physical sector that provides the best performance while communicating with wireless device 102 and reduces interference from noise source 110.

Figure 9:
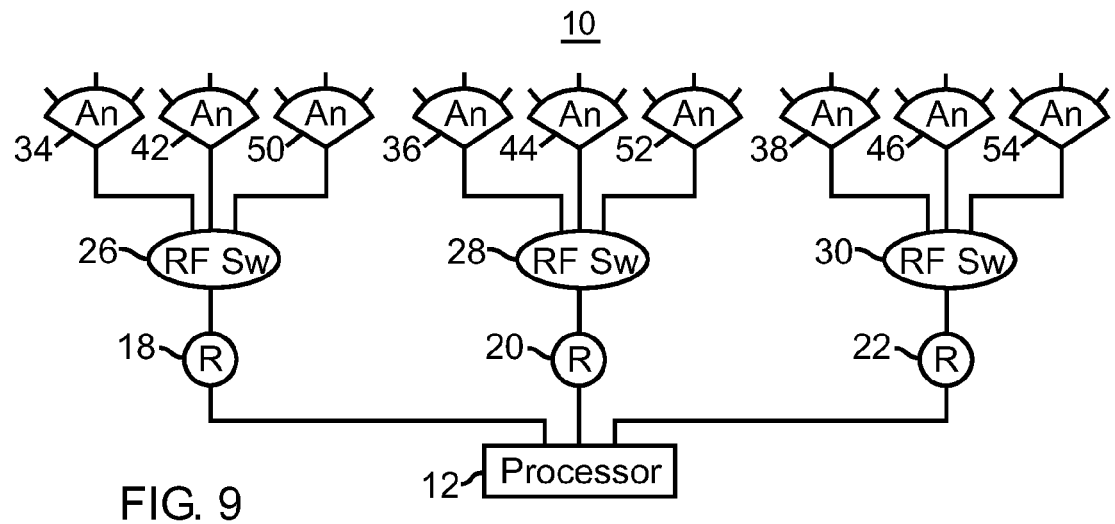
FIG. 9 is a diagram of an exemplary wireless device having three radios and three antennas for each radio.
Figure 10:
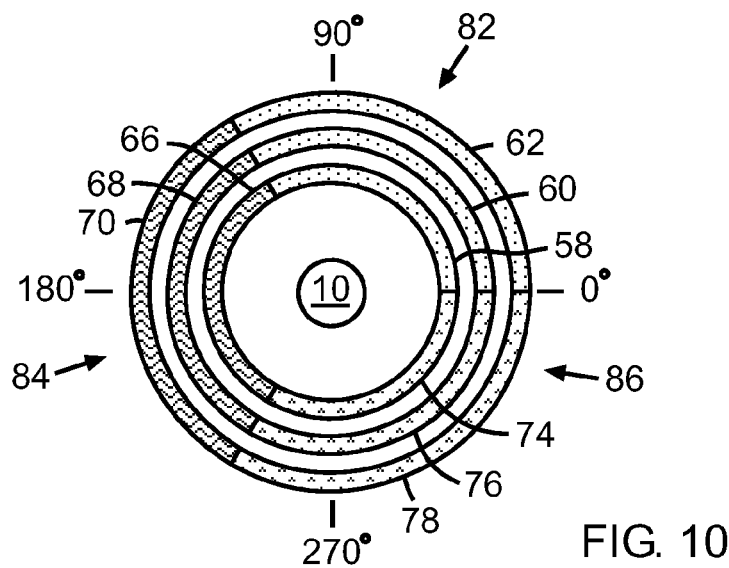
FIG. 10 is a diagram of exemplary physical sectors that form exemplary MIMO physical sectors.

In another embodiment of a MIMO system, referring to FIG. 9, wireless device 10 comprises a processor 12, three radios 18-22, three RF switches 26-30, and three antennas interfacing with each RF switch. Antennas 34-38, 42-46, and 50-54 may have any angle of coverage, be oriented in any direction, form MIMO antennas, and form MIMO virtual sectors in any manner. In an exemplary embodiment, referring to FIG. 10, each antenna 34-38, 42-46, and 50-54 has an angle of coverage of about 120 degrees. Antennas 34-38 are oriented so that their associated physical sectors, 58-62 respectively, substantially overlap to form MIMO physical sector 82. Antennas 42-46 are oriented so that their associated physical sectors, 66-70 respectively, substantially overlap to form MIMO physical sector 84. Antennas 50-54 are oriented so that their associated physical sectors, 74-78 respectively, substantially overlap to form MIMO physical sector 86. Physical sectors 58-62, 66-70, and 74-78 are oriented such that the center of MIMO physical sectors 82, 84, and 86 are respectively oriented at about 60, 180, and 300 degrees respectively. In this embodiment, the MIMO physical sectors do not substantial overlap. Each radio is set to the same channel, thus the MIMO physical sectors 82-86 each use the same channel. The wireless device embodiment of FIGS. 9 and 10 may also be used to reduce interference with noise sources by selected one of the three MIMO physical sectors for communication.

In another embodiment, not shown, wireless device 10 comprises a processor, four radios, an RF switch interfacing with each one radio, and four directional antennas interfacing with each one RF switch. Each antenna has an angle of coverage of about 90 degrees. The physical sectors of one antenna from each RF switch substantially overlap to form a MIMO physical sector resulting in a MIMO system having four MIMO virtual sectors. Each MIMO physical sector receives coverage from each one of the four radios. The physical sectors of the antennas are oriented in such a way that the MIMO physical sectors do not overlap and the MIMO physical sectors provide a combined angle of coverage of about 360 degrees. All radios are set to the same channel.

In another embodiment, not shown, wireless device 10 comprises a processor, two radios interfacing with the processor, an RF switch interfacing with each one of the radios, and three directional antennas interfacing with each one RF switch. Each antenna has an angle of coverage of about 120 degrees. The physical sectors of one antenna from each one RF switch substantially overlap to form a MIMO physical sector resulting in a MIMO system having three MIMO virtual sectors. Each MIMO physical sector receives coverage from each one of the two radios. The physical sectors of the antenna are oriented in such a way that the MIMO physical sectors do not overlap and the MIMO physical sectors provide a combined angle of coverage of about 360 degrees. All radios are set to the same channel.

In another embodiment, not shown, wireless device 10 comprises a processor, two radios interfacing with the processor, an RF switch interfacing with each one of the radios, and "N" directional antennas interfacing with each one RF switch. Each antenna has an angle of coverage of about 360 degrees divided by N. Two antennas, one from each RF switch, form a MIMO antenna, thereby forming N MIMO antennas. The physical sectors of the antennas that form each MIMO antenna substantially overlap to form N MIMO physical sectors. The MIMO physical sectors are oriented in such a way that the MIMO physical sectors do not substantially overlap, thereby providing a combined angle of coverage of about 360 degrees. All radios are set to the same channel.

Radios, antennas, and MIMO physical sectors are not limited to using a single channel for communication or to forming MIMO physical sectors that are substantially non-overlapping. Radios may be grouped to provide MIMO physical sectors that use different channels. MIMO physical sectors that communicate on different channels may be positioned to overlap. Overlapping MIMO physical sectors that use different channels may simultaneously communicate less mutual interference.

Figure 11:
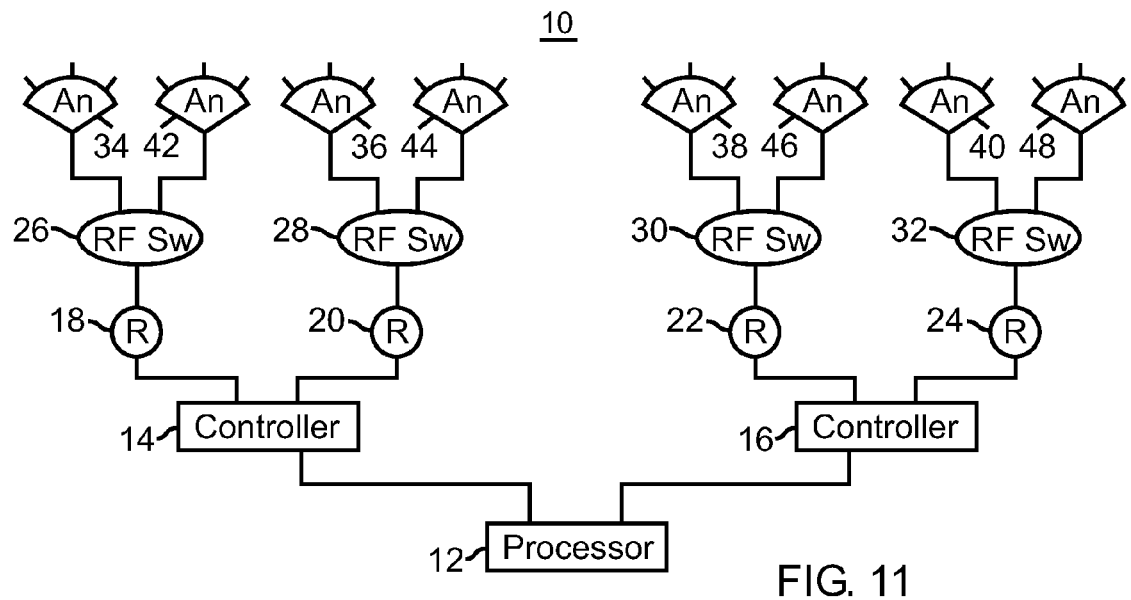
FIG. 11 is a diagram of an exemplary wireless device having two radio groups, each group having two radios and two antennas for each radio.

In one embodiment, referring to FIG. 11, wireless device 10 comprises a process 12, controllers 14, 16 interfaces with processor 10, two radios 18, 20 interface with controller 14 thereby forming a first radio group, two radios 22, 24 interface with controller 16 thereby forming a second radio group, an RF switch 26, 28, 30, 32 interfaces with radio 18, 20, 22, 24 respectively, antennas 34-48 interface with the RF switches in such a manner that two antennas interface with each one RF switch. The antennas may form MIMO antennas any manner; however, forming MIMO antennas using antennas from the same group enables MIMO physical sectors from different groups to operate on different channels.

In one embodiment, antennas 34 and 36 form a first MIMO antenna. Antennas 42 and 44 form a second MIMO antenna. The first and second MIMO antennas belong to the first radio group. Antennas 38 and 40 form a third MIMO antenna. Antennas 46 and 48 form a fourth MIMO antenna. The third and fourth MIMO antennas belong to the second radio group. In another embodiment, antennas 34-40 form a first MIMO antenna and antennas 42-48 form a second MIMO antenna.

Figure 12:
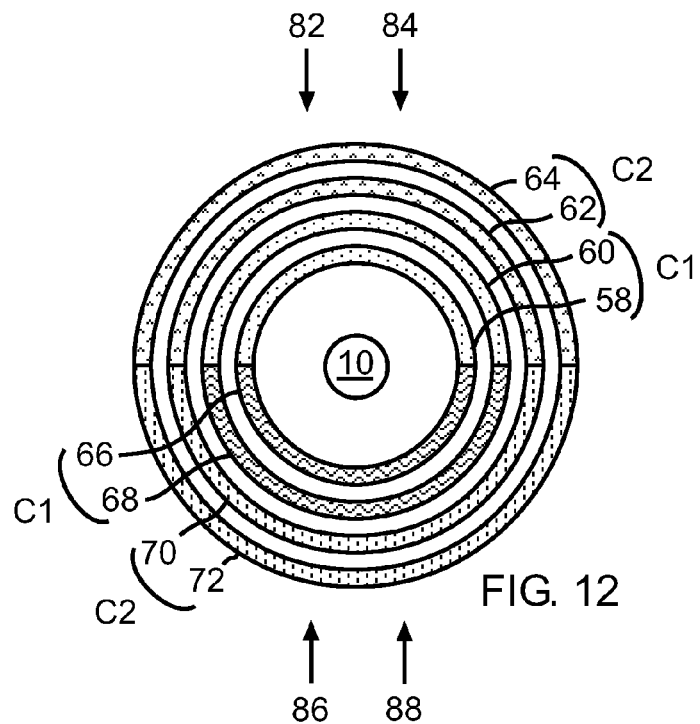
FIG. 12 is a diagram of exemplary physical sectors that substantially overlap to form exemplary MIMO physical sectors.

The antennas and their respective physical sectors may have any angle of coverage and be oriented in any direction. The antennas of the various groups may form MIMO antennas in any manner. The resulting MIMO physical sectors may be overlapping or non-overlapping. In an exemplary embodiment, antennas 34, 36, 38, 40, 42, 44, 46, and 48 and their respective physical sectors 58, 60, 62, 64, 66, 68, 70, and 72 each have an angle of coverage of about 180 degrees. Referring to FIGS. 11 and 12, physical sector 58 substantially overlaps physical sector 60 to form MIMO physical sector 82. Physical sectors 62 and 64 substantially overlap, 66 and 68 substantially overlap, and 70 and 72 substantially overlap to form MIMO physical sectors 84, 86, and 88 respectively. The center of the angles of coverage of antennas 34, 36 and 38, 40 are oriented at about 90 degrees (e.g., up the page), thus MIMO physical sectors 82 and 84 overlap. The center of the angles of coverage of antennas 42, 44 and 46, 48 are oriented at about 270 degrees (e.g., down the page), thus MIMO physical sectors 86 and 88 substantially overlap. Radios 18 and 20 belong to the first radio group and radios 22 and 24 belong to the second radio group. Assigning channel C1 to the first radio group and channel C2 to the second radio group results in MIMO physical sectors 82 and 86 using channel C1 and MIMO physical sectors 84 and 88 using channel C2. Thus, the channel assignment, the antenna orientation, and the MIMO antenna configurations provide overlapping MIMO physical sectors that use different channels. Referring to FIG. 12, MIMO physical sector 82 is assigned to C1, MIMO physical sector 84 is assigned to C2, and MIMO physical sector 82 substantially overlaps MIMO physical sector 84. Because MIMO physical sectors 82 and 84 are assigned different channels, they may communicate with different wireless devices simultaneously with less mutual interference. MIMO physical sectors formed using antennas from different radio groups enables the MIMO physical sectors to overlap, be assigned different channels, and communicate simultaneously. MIMO antennas of the same radio group use the same channel. Interference between MIMO physical sectors formed using antennas from the same group may be reduced by, for example, positioning the MIMO physical sectors in such a way that they do not overlap and communicating using only one MIMO physical sector from the same group at any one time.

In another embodiment, referring to FIG. 11, each one antenna 34-48 has a physical sector with an angle of coverage of about 90 degrees. Antennas are organized, as described above, to form four MIMO antennas. Antenna physical sectors are positioned such that the center of the angle of coverage for antennas pairs 34 and 36, 38 and 40, 42 and 44, and 46 and 48 and their respective physical sectors are oriented at 45, 135, 225, and 315 degrees respectively. Channel C1 is assigned to the first group radios and channel C2 is assigned to the second group radios. The resulting four MIMO physical sectors are positioned to not substantially overlap and adjacent MIMO physical sectors are assigned a different channel. One MIMO physical sector from the first radio group and one MIMO physical sector from the second radio group may operate simultaneously.

The antennas of wireless device 10 may be oriented to form MIMO virtual sectors. MIMO virtual sectors may have any angle of coverage and be oriented in any manner. A MIMO virtual sector may be selected for communication to decrease interference. In one embodiment, referring to FIGS. 1 and 13, antennas 34-38 and 42-46 have an angle of coverage of about 180 degrees. Antennas 34, 36, 38, 42, 44, 46 and the center of the angle of coverage of their respective physical sectors 58, 60, 62, 66, 68, 70 are oriented at 90, 150, 210, 270, 300, and 30 degrees respectively. The area between 0 and 60 degrees, marked as area 150 in FIG. 13, is covered by physical sectors 58, 68, and 70. Antennas 34, 44, and 46 may function together as a MIMO antenna to transmit signals to and receive signals from any wireless device within area 150. Areas 152, 154, 156, 158, and 160 are respectively positioned between about 60-120 degrees, about 120-180 degrees, about 180-240 degrees, about 240-300 degrees, and about 300-0 degrees and are serviced respectively by antennas 34, 36, and 46; 34, 36 and 38; 42, 36 and 38; 42, 44 and 38; and 42, 44 and 46. Each one area 150-160 comprises a MIMO virtual sector.

In an exemplary embodiment, referring to FIGS. 1 and 13, area 150 operates as a MIMO physical sector by forming a MIMO antenna using antennas 34, 44, and 46. Area 152 operates as a MIMO physical sector by forming a MIMO antenna using antennas 34, 36, and 46, and so forth for areas 154-160. In this embodiment, areas 158 and 160 may not be combined to operate as a MIMO physical sector because area 158 requires antennas 42, 44, and 38 to form a MIMO antenna while area 160 requires antennas 42, 44, and 46 to form a MIMO antenna. Because RF switch 30 selects only one antenna at a time, MIMO physical sectors, for this embodiment, are limited to any combination of any one antenna associated with each RF switch. In this embodiment, wireless device 10 may select and communicate through any one MIMO virtual sector at any given time. The method of selecting the MIMO virtual sector consists of setting the RF switches to select the antennas that service the desired MIMO virtual sector. In another embodiment, an RF switch with its associated antennas may be replaced by a phased array. Antenna elements of each phased array may form MIMO antennas.

Figure 14:
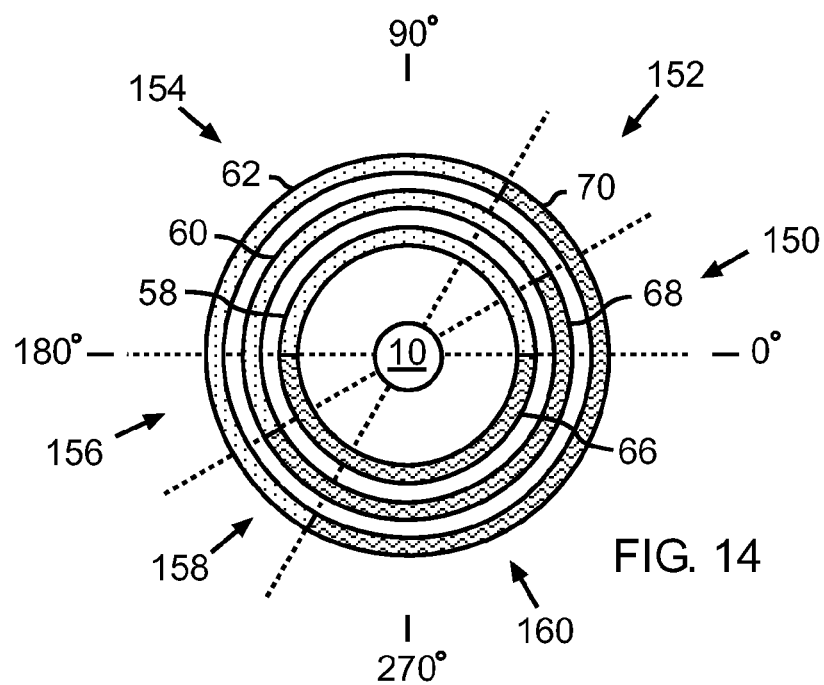
FIG. 14 is a diagram of exemplary physical sectors that partial overlap to form exemplary MIMO virtual sectors.
Figure 15:
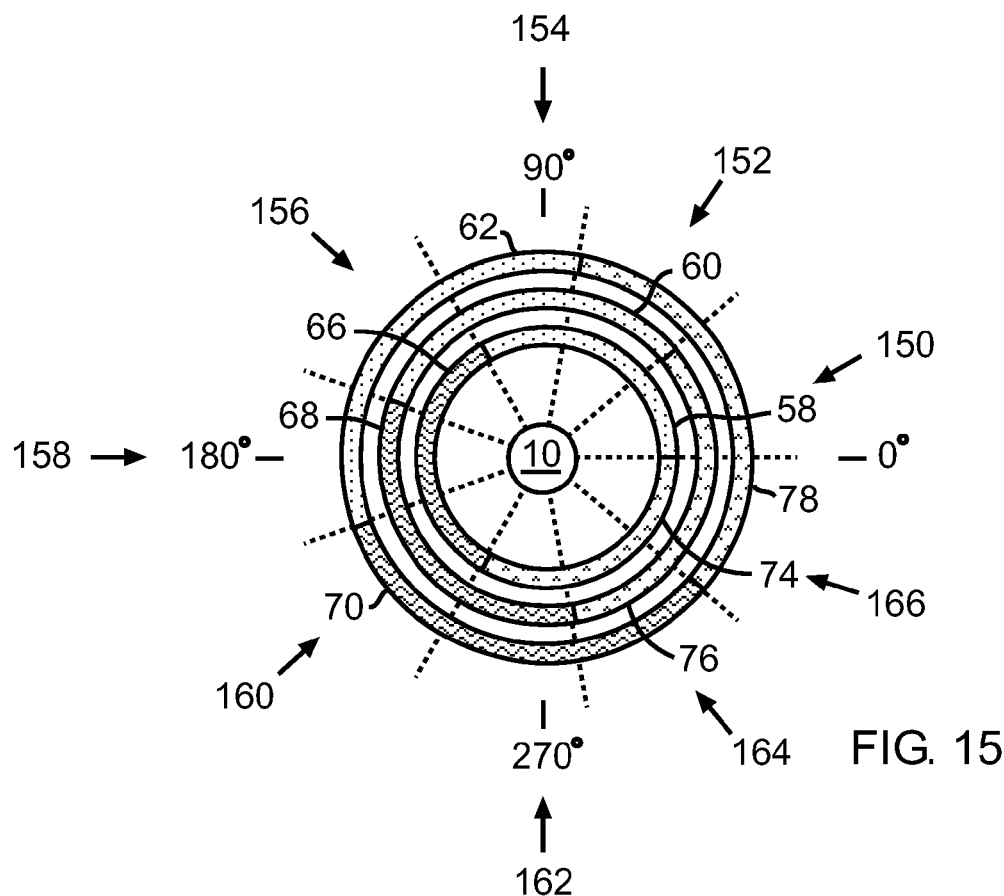
FIG. 15 is a diagram of exemplary physical sectors that partial overlap to form exemplary MIMO virtual sectors.
Figure 16:
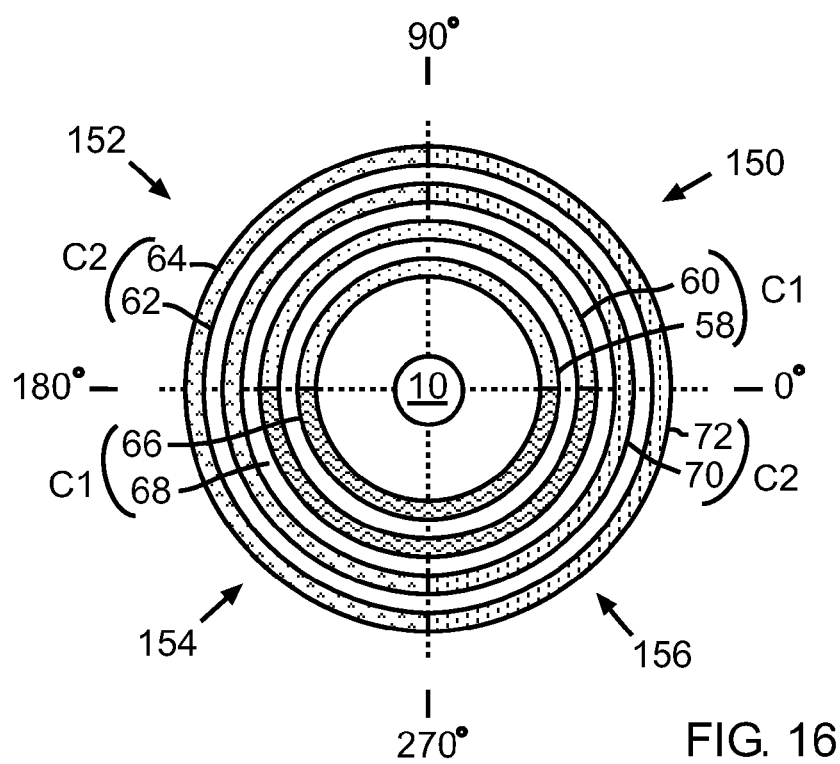
FIG. 16 is a diagram of exemplary physical sectors that substantially overlap to form exemplary MIMO physical sectors and exemplary MIMO physical sectors that partially overlap to form exemplary MIMO physical sectors.
Figure 18:
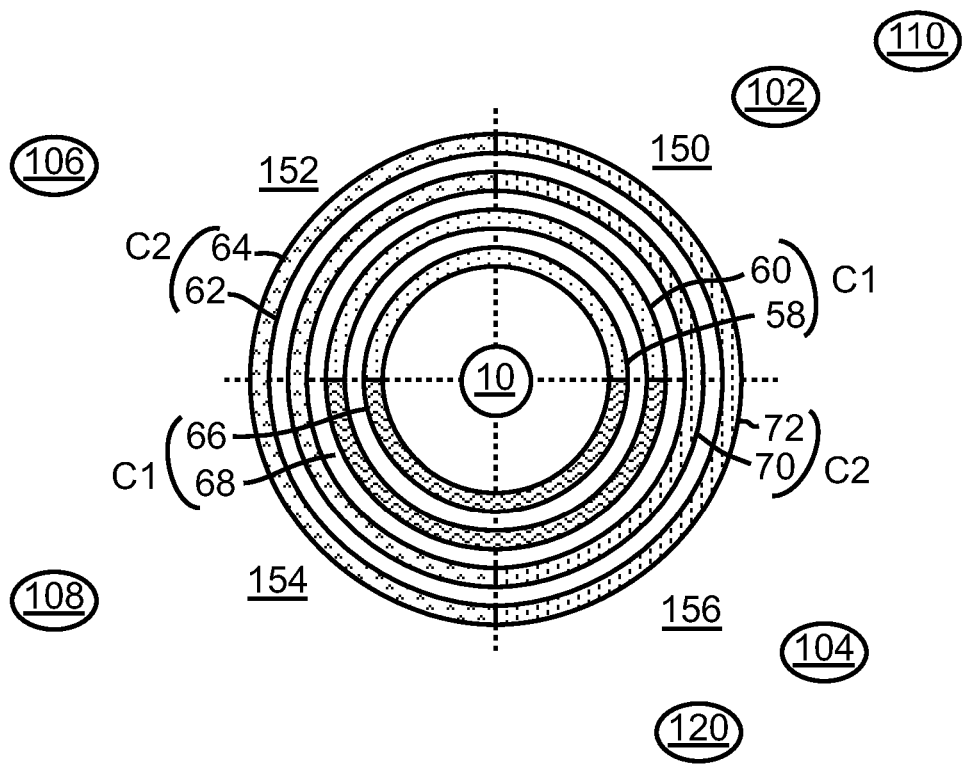
FIG. 18 is a diagram of communication between exemplary wireless devices in the presence of exemplary noise sources.

Antennas may be oriented in any manner to form MIMO virtual sectors of any size. In an exemplary embodiment, referring to FIG. 13, each MIMO virtual sector 150-160 has an angle of coverage of about 60 degrees. In another embodiment, referring to FIG. 14, MIMO virtual sectors 150, 152, 154, 156, 158, and 160 lie between 0-30 degrees, 30-60 degrees, 60-180 degrees, 180-210 degrees, 210-240 degrees, and 240-0 degrees respectively. In another embodiment, referring to FIG. 15, each MIMO virtual sector has an angle of coverage of about 40 degrees. MIMO virtual sectors 150-166 lie between 0-40 degrees, 40-80 degrees, 80-120 degrees, 120-160 degrees, 160-200 degrees, 200-240 degrees, 240-280 degrees, 280-320 degrees, and 320-0 degrees respectively. In another embodiment, referring to FIGS. 11 and 18, each MIMO virtual sector has an angle of coverage of about 90 degrees. Channel C1 is assigned to the first group radios and channel C2 is assigned to the second group radios. Antenna pairs 34 and 36, 38 and 40, 42 and 44, and 46 and 48 respectively form MIMO antennas. MIMO virtual sectors formed by antennas 34, 36 and 42, 44 extend from 0-180 and 180-0 degrees respectively and are assigned channel C1. MIMO virtual sectors formed by antennas 38, 40 and 46, 48 extend from 90-270 and 270-90 degrees respectively and are assigned channel C2. The MIMO virtual sectors are positioned to form areas 150-156 which each receive coverage from two MIMO virtual sectors that operate on different channels.

A wireless device may select and communicate through a MIMO virtual sector to improve performance. A wireless device may use any criteria for selecting a MIMO virtual sector for communication such as, for example, the presence of noise sources, noise source channels used, signal-to-strength ratio, direction of primary data flow, signal quality, signal strength, and data throughput.

Figure 17:
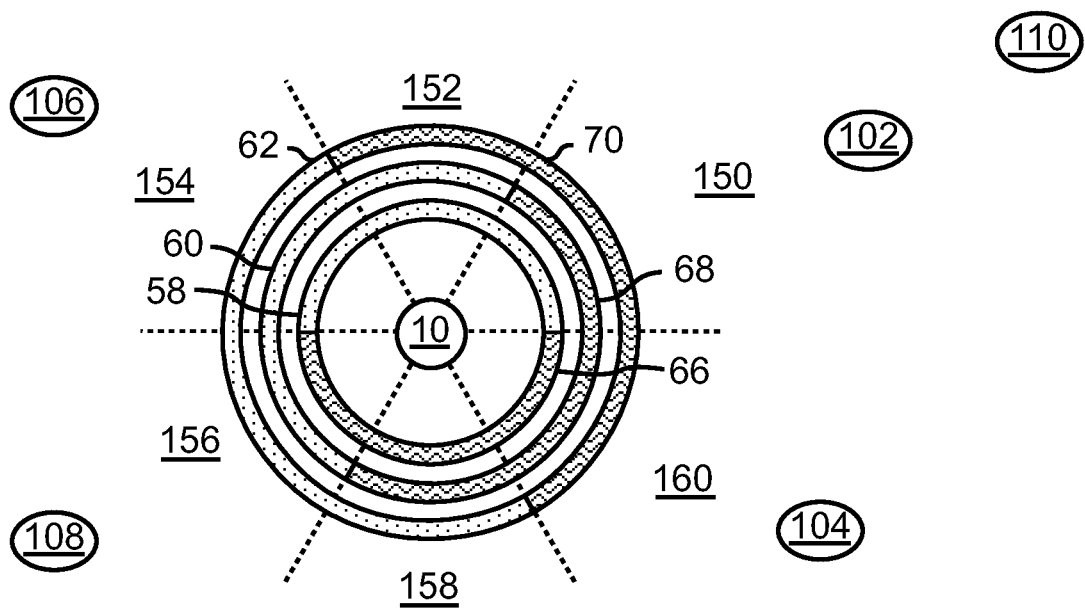
FIG. 17 is a diagram of communication between exemplary wireless devices in the presence of noise sources.

In one embodiment, referring to FIGS. 9 and 17, wireless device 10 desires to communicate with wireless device 102. Wireless device 10 successively enables each antenna combination that forms each MIMO virtual sector 150-160. Through each MIMO virtual sector, wireless device 10 measures its ability to communicate with wireless device 102. Through at least MIMO virtual sector 150, wireless device 10 detects the presence of noise source 110. Through at least MIMO virtual sectors 154 and 156, wireless device 10 detects the presence of noise sources 106 and 108 respectively. While communicating with wireless device 102, wireless device 10 may reduce interference from noise sources 106 and 108 by selecting and communicating through MIMO virtual sector 150. In the embodiment of wireless device 10 shown in FIGS. 1 and 17, areas adjacent to the selected MIMO virtual sector have at least one antenna in common, thus selecting a MIMO virtual sector does not disable all communication in other sectors, but communication within the selected MIMO virtual sector may provide increased performance than adjacent areas because it transmits and/or receives using all the antennas that form the MIMO antenna.

Referring still to FIGS. 1 and 17, wireless device 10 may reduce interference from noise source 110 by selecting a channel that is different from the channel used by noise source 110. In the event that wireless device 102 cannot switch to a channel that is not used by noise source 110, communication with wireless device 102 may proceed using MIMO virtual sector 150 if it provides a desired level of performance. A wireless device may select any MIMO virtual sector that provides a desired level of performance. In this embodiment, wireless device 10 may select MIMO virtual sector 152 to communicate with wireless device 102. Wireless device 10 may detect less interference from noise source 110 through MIMO virtual sector 152 than it detects through MIMO virtual sector 150, but wireless device 10 may also receive a less desirable signal from wireless cell 102. In the event that wireless device 10 desires to communicate with wireless device 104 and noise sources 106, 108, and 110 all operate on the same channel as wireless device 104, wireless cell 10 may reduce interference from the noise sources by selecting MIMO virtual sector 160 for communicating with wireless device 104. A wireless device may select and use any MIMO virtual sector for any duration of time. A wireless device may switch from using one MIMO virtual sector to using any other MIMO virtual sector at any time and for any purpose. In an exemplary embodiment, referring to FIG. 17, wireless device 10 switches between MIMO virtual sectors 150 and 160 to communicate with wireless devices 102 and 104 respectively. Additionally, a wireless device may transmit through one MIMO virtual sector and receive through a different MIMO virtual sector. In another embodiment, referring to FIGS. 11 and 18, wireless device 10 may select the MIMO virtual sector that provides a desired level of communication for each area. Additionally, wireless device 10 may communicate with two wireless devices 104 and 120, both in area 156, simultaneously on different channels; for example, wireless device 104 communicates using channel C1 while wireless device 120 communicates using channel C2.

Unless contrary to physical possibility, the inventor envisions the methods and systems described herein: (i) may be performed in any sequence and/or combination; and (ii) the components of respective embodiments combined in any manner.

Although there have been described preferred embodiments of this novel invention, many variations and modifications are possible and the embodiments described herein are not limited by the specific disclosure above, but rather should be limited only by the scope of the appended claims.

What is claimed is:

1. A system for wirelessly communicating with provided wireless devices via a plurality of multiple-input-multiple-output ("MIMO") antennas, the system comprising:
   a first radio group comprising a first MIMO physical sector for communicating using a first channel; and
   a second radio group comprising a second MIMO physical sector for communicating using a second channel;
   wherein:
      the first MIMO physical sector overlaps at least 30 percent of an area of the second MIMO physical sector thereby forming an area of overlap;
      a frequency of the first channel is different from a frequency of the second channel;
      each radio group respectively further comprises:
         a phased array; and
         at least two radios coupled to the phased array, the radios cooperate with the phase array to form a physical sector for each radio, each physical sector having an angle of coverage less than 360 degrees, the physical sector of each radio at least partially overlaps the physical sector of the other radios of the radio group to form the MIMO physical sector of the radio group, the physical sectors of the phased array operate as a MIMO antenna.

2. The system of claim 1 wherein the first MIMO physical sector substantially overlaps the second MIMO physical sector thereby forming the area of overlap.

3. The system of claim 1 wherein:
   the first radio group communicates with a first provided wireless device via the first MIMO physical sector in the area of overlap using the first channel; and
   the second radio group communicates with a second provided wireless device via the second MIMO physical sector in the area of overlap using the second channel.

4. The system of claim 1 wherein the first radio group comprises three radios.

5. The system of claim 1 wherein the second radio group comprises three radios.

6. The system of claim 1 wherein the radios of at least one of the first radio group and the second radio group communicate using one of the IEEE 802.11 communication protocols.

7. The system of claim 1 wherein the radios of at least one of the first radio group and the second radio group communicate using the IEEE 802.11n communication protocol.

8. A system for wirelessly communicating with provided wireless devices via a plurality of multiple-input-multiple-output ("MIMO") antennas, the system comprising:
   a first radio group comprising a plurality of MIMO physical sectors, each MIMO physical sector for communicating using a first channel; and
   a second radio group comprising a plurality of MIMO physical sectors, each MIMO physical sector for communicating using a second channel; wherein:
   each MIMO physical sector of the first radio group overlaps at least 30 percent of an area of at least one MIMO physical sector of the second radio group thereby forming a plurality of areas of overlap;
   a frequency of the first channel is different from a frequency of the second channel;
   each radio group respectively further comprises:
      a phased array; and
      at least two radios coupled to the phased array, the radios cooperate with the phase array to form a physical sector for each radio, each physical sector having an angle of coverage less than 360 degrees, two physical sectors at least partially overlap to form each respective MIMO physical sector of the radio group, the overlapping physical sectors of the phased array operate as a respective MIMO antenna.

9. The system of claim 8 wherein each MIMO physical sector of the first radio group substantially overlaps a respective MIMO physical sector of the second radio group thereby forming the plurality of areas of overlap.

10. The system of claim 8 wherein:
   the first radio group communicates with a first provided wireless device via one MIMO physical sector of the first radio group using the first channel; and
   the second radio group communicates with a second provided wireless device via one MIMO physical sector of the second radio group using the second channel.

11. The system claim 8 wherein the first radio group communicates with a first provided wireless device and the second radio group communicates with a second provided wireless device in a same area of overlap.

12. The system of claim 8 wherein the first radio group comprises three radios.

13. The system of claim 8 wherein the second radio group comprises three radios.

14. The system of claim 8 wherein the radios of at least one of the first radio group and the second radio group communicate using one of the IEEE 802.11 communication protocols.

15. The system of claim 8 wherein the radios of at least one of the first radio group and the second radio group communicate using the IEEE 802.11n communication protocol.

* * * * *